3,700,605
CATALYSTS
David Dodman, Kenneth William Pearson, and John Mathers Woolley, Manchester, England, assignors to Imperial Chemical Industries Limited, London, England
No Drawing. Filed Apr. 13, 1970, Ser. No. 28,133
Claims priority, application Great Britain, Apr. 18, 1969, 19,974/69
Int. Cl. B01j 11/06
U.S. Cl. 252—471    3 Claims

ABSTRACT OF THE DISCLOSURE

Manufacture of catalysts by contacting a manganese oxide precipitate containing bound alkali (especially a precipitate obtained by reduction of a permanganate with formaldehyde) with a salt of cobalt, copper, silver or lead, to replace the alkali by the heavy metal. Use of the catalysts in reducing nitro compounds to nitroso, azo, azoxy or amino compounds.

---

This invention relates to compositions of matter suitable for use as catalysts, to methods of manufacturing such compositions of matter and to reduction processes in which the said compositions of matter are used as catalysts.

According to the invention a process for the manufacture of a composition of matter suitable for use as a catalyst comprises contacting a manganese oxide precipitate containing bound alkali metal with an aqueous solution of salts of one or more heavy metals as hereinafter defined whereby to replace the alkali metal in said precipitate by said heavy metals, and thereafter separating the solid from the liquid phase and drying it.

We distinguish between bound alkali metal, which can be removed from manganese oxide precipitates only very slowly by washing with water, and unbound alkali metal which can be removed easily by washing with water. Bound alkali is believed to be attached by chemical bonding to the manganese oxide. The manganese oxide precipitate used in the process of the invention should preferably be substantially free from unbound alkali metal.

A manganese oxide precipitate containing bound alkali-metal may be obtained in known manner. Thus for example a permanganate may be reduced preferably in the presence of excess alkali metal hydroxide, e.g. sodium or potassium hydroxide by means of a reducing agent, for example formaldehyde, acetaldehyde, methanol, ethanol or glucose. By reduction of a permanganate, particularly with formaldehyde, the said manganese oxide precipitate is produced in a bulky hydrated form which is especially suitable for use in the process of the invention. Another known method of obtaining a manganese oxide precipitate containing bound alkali metal comprises treating a manganese salt with an alkali metal hydroxide in the presence of an oxidising agent, for example oxygen or a hypochlorite.

The term "heavy metal" as used herein denotes one of the following elements: Ti, V, Cr, Fe, Co, Ni, Cu, Zr, Mo, Ag, Sn, Sb, Ta, W, Re, Au, Hg, Tl, Pb, Bi.

Of these the preferred heavy metals are Co, Cu, Ag and especially Pb, since these provide compositions having the most valuable catalytic properties.

The process of the invention may be carried out in simple manner by suspending the said manganese oxide precipitate in water, adding aqueous solutions of the heavy metal salts and leaving the mixture, preferably with some agitation, until replacement of alkali metal by heavy metal has taken place. Desirably such replacement should be substantially complete, for the presence of alkali metal generally has an adverse effect upon the catalytic properties of the product. With a loose bulky precipitate such as is obtained by reduction of a permanganate, contact times of about 1 to 24 hours at ambient temperature are sufficient to effect substantially complete replacement.

Separation of the solid from the liquid phase can be carried out in conventional manner, for example by decantation, filtration or centrifuging. Desirably the solid should be washed with water to remove soluble substances before being dried.

Advantageously the process of the invention may be carried out in the presence of an inert insoluble substance which will act as a catalyst support, for example kieselguhr, silica, pumice, asbestos or fire clay. Such supporting substances may advantageously be incorporated at an early stage of the manufacturing process; for example they may be suspended in aqueous permanganate solution which is reduced in the presence of excess alkali metal hydroxide. By incorporating a supporting substance in this way, pulverent products are obtained after drying and these have high catalytic activity. When no supporting substance is incorporated the dried products are harder and more difficult to grind and their catalytic activity is lower than that of supported products having the same metal content.

It is belived that the products of the process of the invention have a fundamental lattice composed of manganese and oxygen atoms and that atoms of the other heavy metals act as impurity atoms in the lattice, making chemical imperfections in it which are responsible for the catalytic properties.

The atomic porportion of manganese relative to all other heavy metals in the products should desirably be from 20:1 to 2:1.

Optionally the compositions of matter produced by the process of the invention may be partially reduced by treatment with carbon monoxide or hydrogen prior to use as a catalyst.

Compositions of matter obtained in the above described manner, especially those which are preferred, have long life as effective catalysts. The activity and life of known manganese catalysts is adversely affected by bound or adherent alkali metal. In the present process such alkali metal is necessarily removed.

A further feature of the invention comprises using the compositions of matter obtained in the above described manner as catalysts, particularly for the reduction of nitrocompounds. Reduction of nitrocompounds by means of carbon monoxide is effectively catalysed by the said composition, in many cases to yield nitrosocompounds.

According to a preferred feature of the invention a reduction process for the manufacture of an aromatic nitroso, azoxy or azocompound comprises contacting at elevated temperature an aromatic nitrocompound with carbon monoxide in the presence of a catalyst comprising a composition of matter prepared in the manner hereinbefore described.

Preferred catalysts for use in the reduction process of the invention comprise oxides of manganese, and of cobalt, silver, copper or especially lead, since these give the highest rates of reduction.

Nitrocompounds which may be used in the reduction process of the invention include nitrobenzene and substituted nitrobenzenes, for example p-nitrotoluene, o-nitrotoluene, p-chloronitrobenzene, m-nitrotoluene, p-nitroethylbenzene, p-nitrobutylbenzene, m-nitrobenzonitrile, m-nitroanisole, p-nitroanisole, 4-nitrodiphenyl, 4-nitrodiphenylether, m-nitroacetophenone, p-bromonitrobenzene and 3,4-dichloronitrobenzene.

The carbon monoxide used in the reduction process of the invention need not be pure. It may, for example, contain a carrier gas which is inert under the conditions used, for example nitrogen or carbon dioxide. It is essential that the carbon monoxide should not be in admixture with hydrogen, otherwise over-reduction takes place and the yield of nitroso-, azoxy- or azo-compound is diminished.

In one embodiment of the reduction process of the invention may be carried out in a continuous manner by passing the nitrocompound either in a liquid phase (i.e. in the liquified state or in solution) or in the vapour phase, together with gaseous carbon monoxide through or over a bed of catalyst. Fixed bed or fluid bed techniques may be adopted and the flow of carbon monoxide and nitrocompound may be in the same or in opposite directions as desired. By using a high flow rate of carbon monoxide and nitrocompound, short contact times (of the order of one minute or less) of the product on the catalyst bed can be achieved and these are beneficial for the production of nitrosocompounds. When all the reactants are in the vapour phase, fluid bed techniques are advantageous since by this means, short contact times may easily be arranged.

If a nitrosocompound produced by the reduction process is more readily volatilised than the nitrocompound it is possible to operate under conditions whereby the carbon monoxide gas stream quickly sweeps out vapourised nitrosocompound from the catalyst and nitrocompound. For example the nitrocompound together with suspended catalyst may be heated at a temperature below or up to its boiling point and a rapid stream of gaseous carbon monoxide passed through the hot suspension. The nitrosocompound may be recovered from the effluent gases, for example by cooling.

The temperature at which the reduction process of the invention is carried out depends upon the nitrocompound, the catalyst employed and the product derived. Generally the temperature is in excess of 100° C. and with the preferred catalysts the most advantageous temperatures are from 100° C. to 400° C., especially 105° to 320° C.

The reduction process may in general be carried out at atmospheric pressure, but higher pressures are sometimes desirable. Pressures up to 40 p.s.i.g. have given increased yields of nitroso compounds.

Contact times are dependent upon the catalyst, the mode of operating the process and the product desired. When the preferred catalysts are used in a fluid bed process, contact times of 5 to 60 seconds, especially 15 to 35 seconds have been found satisfactory for production of nitrosocompounds. Long contact times give increased proportions of higher reduced products such as azo compounds and azoxy compounds.

Volatile compounds forming the product of the reduction process pass forward from the catalyst bed and may be collected by disillation.

According to yet a further feature of the invention a process for the manufacture of aromatic amines comprises contacting an aromatic nitrocompound with a reducing agent comprising hydrogen or comprising carbon monoxide and water or aliphatic alcohol in the presence of catalyst comprising a composition of matter prepared in the manner hereinbefore described.

The hydrogen used in this process of the invention need not be pure. Carrier or diluent gases for example nitrogen may be present in admixture with the hydrogen, and it is economically advantageous to employ mixtures containing carbon monoxide which, as indicated above, itself effects a partial reduction of the aromatic nitrocompound.

Diluents which are normally liquid may also be present in the process of the invention and may in some cases influence the reaction which takes place. The use of water or an alcohol or mixtures thereof as a solvent or diluent is of especial importance, for example for the reduction of aromatic nitrosulphonic acids. Alcohol solvents, either alone or in admixture with water are valuable for the reduction of aromatic nitrocompounds which are not soluble in water.

Water or aliphatic alcohol, besides acting as a diluent or solvent may enter into the reaction, providing a source of hydrogen, and thus when carbon monoxide and water or aliphatic alcohol (e.g. methanol, ethanol, n-propanol, isopropanol, n-butanol or iso-butanol) is used as reducing agent the presence of elementary hydrogen is unnecessary. Thus for example the reduction of aqueous solutions of aromatic nitrosulphonic acids with carbon monoxide alone in presence of a catalyst as aforesaid produces aromatic aminosulphonic acids.

In a particular embodiment of this process of the invention therefore an aromatic aminosulphonic acid is manufactured from an aromatic nitrosulphonic acid by contacting an aqueous solution thereof with hydrogen, carbon monoxide or a mixture thereof in the presence of the catalyst.

If desired this process of the invention may be operated continuously by passing an aromatic nitrocompound in liquid phase (i.e. in liquified state or in solution) and the reducing agent through a bed of the catalyst. Either fixed bed or fluid bed techniques may be adopted and as desired the flow of liquid and gas may be in the same or opposite directions through the bed. It is not necessary for the apparatus to be capable of withstanding very high pressures. The reduction of liquified nitro compounds proceeds satisfactorily at substantially atmospheric pressure, i.e. in the pressure range from atmospheric up to the slightly increased pressures (for example about two atmospheres) which are usually built up inside a continuously operating plant in which this type of reaction is taking place. For the reduction of aromatic nitro-sulphonic acids in aqueous solution somewhat higher pressures (e.g. above 2 atmospheres) are preferred so that the temperature may exceed 100° C. In all cases, temperatures above 100° C. are preferred. Above 200° excessive quantities of undesirable by-products are sometimes formed.

The process of the invention provides an economic method of reducing aromatic nitrocompounds to primary amines, and is especially valuable when hydrogen is used in the form of water-gas or producer gas, such gases being frequently available in chemical factories at sites where there is no immediate supply of pure hydrogen.

When carbon monoxide is present in the reducing gases used in a reduction process of the invention operated continuously the carbon dioxide by-product formed may be scrubbed out of the issuing gas and residual carbon monoxide may be recirculated through the reduction zone. Alternatively the issuing gases may be contacted with carbon (e.g. coke) at high temperature to reduce the carbon dioxide to carbon monoxide which is recirculated through the reduction zone.

The invention is illustrated but not limited by the following examples in which the parts are by weight unless otherwise stated:

EXAMPLE 1

(a) 32 parts of potassium permanganate are dissolved in 1500 parts of water at 20° C. When dissolved, 12 parts of potassium hydroxide are added and after stirring until dissolved, 10 parts of kieselguhr are added and then 13 parts of approximately 40% formaldehyde are added slowly. A bulky precipitate of a manganese oxide on kieselguhr forms. After stirring for 15 minutes a sample is spotted onto filter paper and if this shows the presence of permanganate, an additional quantity of formaldehyde sufficient to remove this is added. The precipitate is filtered and washed on the filter with 1000 parts of water, after which it is suspended in 1000 parts of water and stirred until all lumps are broken up and even suspension is obtained. To the suspension is added a solution of 36 parts of lead nitrate, dissolved in 30 parts of water. After stirring for 1 hour the precipitate is filtered and washed repeatedly with water, finally with deionised water and dried at 100° C. 32 parts of a catalyst containing approximately 1 atom proportion of lead to 4 atom proportions of manganese is obtained as a pulverent powder which has excellent activity and long life for the reduction of nitrobenzene to nitrobenzene with carbon monoxide.

(b) The above process is repeated, omitting the kieselguhr. The product dries to a hard glassy mass which is difficult to grind up and has lower catalytic activity.

(c) Replacement of the kieselguhr by an equal weight of an active charcoal (Actibon S) produces also a catalyst of equal high activity.

Other reducing agents which may be used in place of the formaldehyde are 25 parts of methanol or ethanol or 20 parts of glucose.

EXAMPLE 2

In place of the lead nitrate in Example 1 there is used 32 parts of cabaltous nitrate $Co(NO_3)_2 6H_2O$ dissolved in 300 parts of water. After drying 30 parts of product are obtained as a black pulverent powder containing approxmately 1 atom proportion of cobalt to 4 atom porportions of manganese. This has excellent catalytic activity and long life for the reduction of nitrobenzene to nitrosobenzene with carbon monoxide.

EXAMPLE 3

In place of the lead nitrate in Example 1 there is used 18 parts of silver nitrate dissolved in 300 parts of water. After drying, 30 parts of product are obtained containing approximately 1 atom proportion of silver to four atoms of manganese. The product is an excellent catalyst useful for carbon monoxide reduction of nitrocompounds.

EXAMPLE 4

In place of the lead nitrate in Example 1 there is used 10 parts of copper sulphate dissolved in 200 parts of water. After drying, 25 parts of a product are obtained containing approximately 1 atomic proportion of copper to 10 atoms of manganese, which is an excellent catalyst for the preparation of azobenzene from nitrobenzene.

EXAMPLE 5

An alternative method for preparing an alkali-containing manganese oxide for conversion to catalyst is as follows:

23 parts of manganese sulphate tetrahydrate is dissolved in 1000 parts of water. 5 parts of kieselguhr is added and then with stirring 30 parts of 30% sodium hydroxide solution and 30 parts of 30% sodium hypochlorite solution are added at equal rates during 30 minutes. After stirring for a further 15 minutes, the precipitate is filtered, washed with 400 parts of water and then transferred to a vessel together with 500 parts of water. After stirring until all lumps are dispersed, a solution of 10 parts of lead nitrate in 100 parts of water is added after stirring for a further 15 minutes the product is filtered, washed with water (400 parts) and dried at 100° to constant weight. 18 parts of catalyst is obtained which contains approximately 3 atomic proportions of lead to 10 atomic proportions of manganese.

In place of the lead nitrate in this example there may be used 9 parts of cobalt nitrate hexahydrate or 8 parts of copper sulphate pentahydrate, or 5 parts of silver nitrate to give catalysts comprising manganese oxide containing cobalt, copper or silver respectively.

EXAMPLE 6

An externally heated reaction vessel of 500 mls. capacity is fitted with an agitator, thermocouple, inlet feeds for carbon monoxide gas (delivering below the agitator) and nitrobenzene and a vertical outlet tube 15 cm. long and 1 cm. in diameter connected at the top to a receiver cooled in a solid carbon dioxide/methanol bath. From the receiver exit, gases containing carbon monoxide are led through a scrubbing column containing sodium hydroxide or granular soda lime which removes carbon dioxide and water vapour and the residual carbon monoxide is passed back to the inlet feed for carbon monoxide for re-use in the process.

Into the reaction vessel is charged 200 g. of nitrobenzene and 20 g. of catalyst prepared as in Example 1. Carbon monoxide is passed into the reactor at a rate of 10 litres per hour, including re-cycled gas, and the temperature inside the reactor is raised to 212° C. during the perature inside the reactor is raised to 212° C. during one hour. After this period the temperature is maintained at a level such that nitrobenzene refluxes gently in the vertical outlet tube. Initially for approximately 2 hours at 212° C., during which period the catalyst is being conditioned, water and nitrobenzene collect in the receiver and when no more water distils the receiver is emptied. Pure nitrosobenzene then collects at a rate of approximately 8.0 g. per hour. The level of nitrobenzene in the reaction flask is maintained by the addition of approximately 10 g. of nitrobenzene per hour.

After 60 hours operating time the catalyst shows no loss of activity.

If desired the initial catalyst conditioning period may be avoided by heating the catalyst at 200° C. in a stream of carbon monoxide gas until water vapour and carbon dioxide is no longer evolved. Such a pre-reduced catalyst when used in the above process immediately gives nitrosobenzene at a reaction temperature of 212° C.

By operating at 12 p.s.i.g. instead of atmospheric pressure, but otherwise using the conditions described in this example the yield of nitrosobenzene is increased to 16 g. per hour.

In place of the Example 1 catalyst there may be used any of the catalysts prepared as in Examples 2–5. Similar conversion rates of nitrobenzene to nitrosobenzene are obtained.

EXAMPLE 7

Preparation of azobenzene from nitrobenzene 5 parts of the catalyst of Example 1 are mixed to a paste with 5 parts of water. 5 parts of pumice granules (size 8–20 mesh) are stirred in, and the product is then dried to constant weight at 100° C. to give pumice granules coated with a layer of dry catalyst. This product is packed into a hard glass tube of 0.8 cm. internal diameter to give a packed length of 20 cms. The tube is surrounded by an electrical heating element and is provided with a thermocouple pocket for measuring the temperature of the packed catalyst. To the base of the tube are connected inlet feeds for nitrobenzene and carbon monoxide. The top of the tube leads directly to a product receiver, from which the exit gases are directed to a scrubber containing aqueous sodium hydroxide to remove carbon dioxide, then to a silica gel drying unit and then to a pump for recycling the purified monoxide back through the unit. Carmbon monoxide is passed through initially at ambient temperature to displace the air, recycling is then commenced and the column is heated until the temperature of the catalyst bed is 200° C. The flow rate is adjusted to 50–100 mls./minute and nitrobenzene feed is started at a rate of approximately 10 g./hr. The reaction is exothermic and the heating and nitrobenzene feed rate are adjusted to give a catalyst temperature of 240°. Azobenzene distills and is collected in the received. The feed rate of nitrobenzene determines the percentage conversion. If the feed is too high some nitrobenzene distills the azobenzene but by suitable adjustment essentially per azobenzene collects in the receiver with a yield of approximately 80% of theory on the nitrobenzene charged.

In place of the Example 1 catalyst the catalysts of any of Examples 2–4 can be used.

EXAMPLE 8

A catalyst containing approximately one atom proportion of silver to four atoms of manganese is prepared as in Example 3.

0.7 part of this catalyst are mixed with 25 parts of a wet paste of the magnesium salt of 2-nitro-naphthalene-4,8-disulphonic acid (strength 42%) and 200 parts of water. The whole is charged to a glass-lined autoclave, pressurized to 450 p.s.i. with hydrogen and heated to 150° C. with agitation. After heating at 150° C. for 8 hours, the autoclave is cooled and vented and the contents discharged.

The solution is diluted with water to allow separation of the catalyst and analysis of the liquors shows complete conversion to the magnesium salt of 2-naphthylamine-4,8-disulphonic acid.

After washing and drying, the catalyst is suitable for re-use without any appreciable loss of activity.

We claim:

1. A process for the manufacture of a composition of matter suitable for use as a catalyst comprising contacting a manganese oxide precipitate containing alkali metal hydroxide in a form removable only very slowly by washing with water with an aqueous solution of a salt of a heavy metal selected from the group consisting of cobalt, copper, silver and lead, whereby to replace the alkali metal in said precipitate by heavy metal and form a solid phase wherein the atomic proportion of manganese relative to other heavy metal is from 20:1 to 2:1, and thereafter separating the solid from the liquid phase and drying it.

2. A process according to claim 1 carried out in the presence of an inert insoluble substance which acts as a catalyst support.

3. A process according to claim 1 wherein the manganese oxide precipitate is obtained by reduction of an alkali metal permanganate in the presence of excess alkali metal hydroxide with formaldehyde.

References Cited
UNITED STATES PATENTS

| | | | |
|---|---|---|---|
| 1,345,323 | 6/1920 | Frazer et al. | 252—471 |
| 2,792,436 | 5/1957 | Kroeper et al. | 252—471 |
| 2,874,129 | 2/1959 | Bell | 252—454 |
| 3,065,056 | 11/1962 | Geerts et al. | 252—471 X |

CARL F. DEES, Primary Examiner

U.S. Cl. X.R.

252—447, 454, 459